United States Patent
Hartley-Urquhart

[19]

[11] Patent Number: 6,167,385

[45] Date of Patent: Dec. 26, 2000

[54] SUPPLY CHAIN FINANCING SYSTEM AND METHOD

[75] Inventor: William Roland Hartley-Urquhart, New York, N.Y.

[73] Assignee: The Chase Manhattan Bank, New York, N.Y.

[21] Appl. No.: 09/203,208

[22] Filed: Nov. 30, 1998

[51] Int. Cl.[7] .................................................. G06F 17/60
[52] U.S. Cl. ................ 705/35; 705/39; 705/28; 705/37; 705/7; 705/8
[58] Field of Search .............. 705/7, 8, 35, 39, 705/28, 37

[56] References Cited

U.S. PATENT DOCUMENTS

| | | | |
|---|---|---|---|
| 4,799,156 | 1/1989 | Shavit et al. | 705/28 |
| 5,694,552 | 12/1997 | Aharoni | 705/37 |
| 5,732,400 | 3/1998 | Mandler et al. | |
| 5,774,883 | 6/1998 | Andersen et al. | 705/35 |
| 5,787,283 | 7/1998 | Chin et al. | 395/701 |
| 5,946,662 | 8/1999 | Ettl et al. | 705/8 |

FOREIGN PATENT DOCUMENTS

| | | | |
|---|---|---|---|
| 691467 | 5/1998 | Australia . | |
| 0858057A2 | 8/1998 | European Pat. Off. . | |
| 0 978 795 A2 | 7/1999 | European Pat. Off. | G06F 17/60 |

OTHER PUBLICATIONS

Pfeifenberger, Johannes; Weinstein, David, Public Utilities Fortnightly v131n9, pp. 24–26, May 1, 1993.
"New Cost–effective Trade Finance Program from MSAS Global Logistics", Business Wire, Jul. 14, 1999.

*Primary Examiner*—James P. Trammell
*Assistant Examiner*—Chang Y. Chung
*Attorney, Agent, or Firm*—Ostrolenk, Faber, Gerb & Soffen, LLP

[57] ABSTRACT

A method for financing a supply of goods (a supply chain) from a supplier to a buyer in which the buyer has a lower cost of funds than the supplier. According to the method, the buyer generates a purchase order for the goods which is forwarded to the supplier who in turn ships the goods to the buyer. The supplier sends an invoice to the buyer which stores the invoice data in a database. The financing institution electronically accesses the database to retrieve the daily invoices. The financial institution then calculates the financing applicable to the shipped good and forwards a payment to the supplier. Upon maturity of the financing, the buyer settles with the financial institution by remitting the gross proceeds.

24 Claims, 5 Drawing Sheets

SUPPLY CHAIN FINANCING SYSTEM AND METHOD

FIELD OF THE INVENTION

The present invention relates to financing systems and methods and more particularly to a system and method for financing a supply of goods in a supply chain.

BACKGROUND OF THE INVENTION

Figure 1:
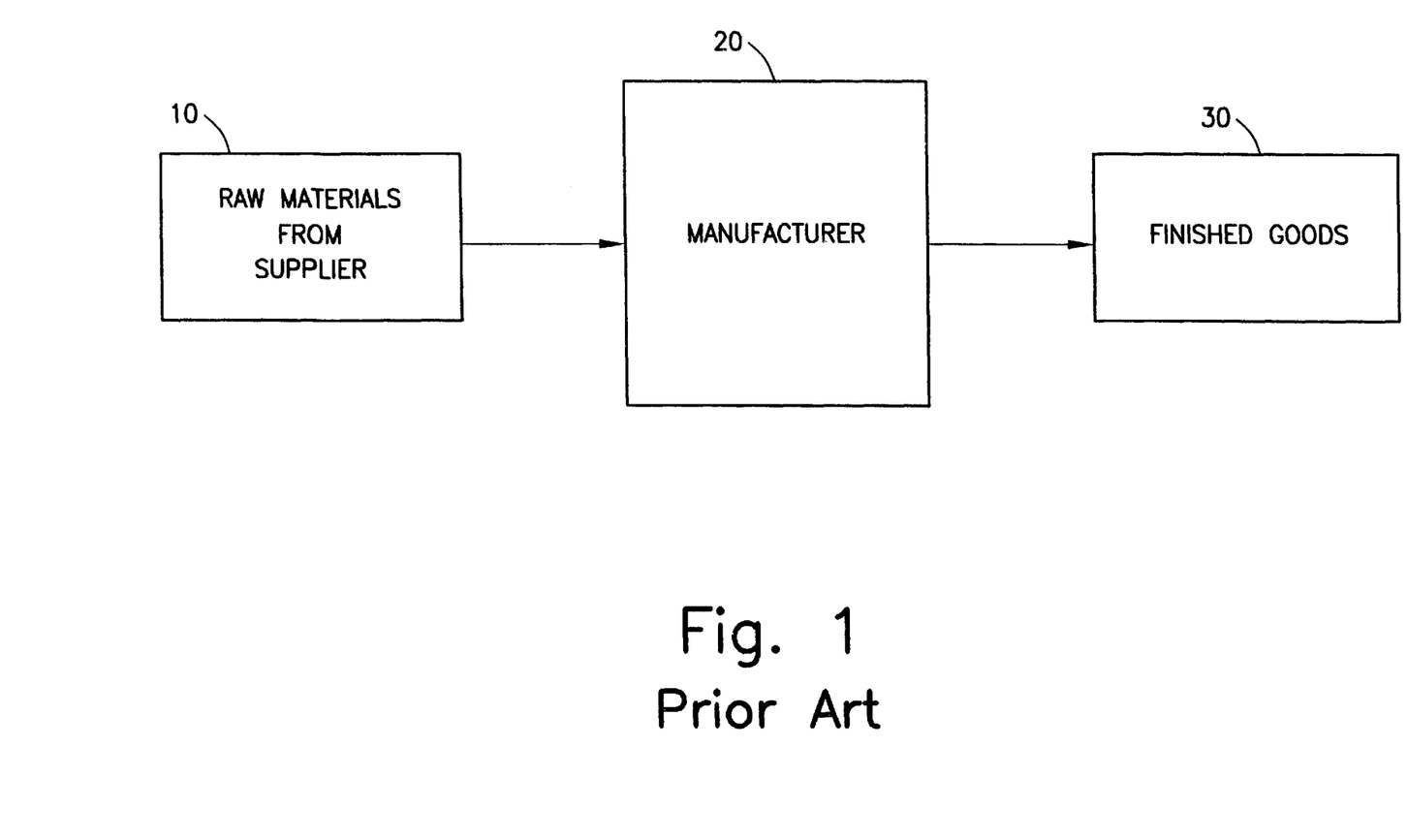
FIG. 1 illustrates the conventional vertically integrated manufacturing process.

Historically, working capital financing had been a one transaction process (from vendor to buyer, or supplier to customer) and usually involved only a single balance sheet or asset class. This method of capital financing is explained in connection with FIG. 1. FIG. 1 illustrates a traditional vertically integrated manufacturing processes. Raw materials 10 from a supplier were delivered to a factory 20 which produced finished goods 30 from the raw materials 10. From a financier's point of view, the only risk it had to understand was whether the manufacturer 20 could profitably transform the raw materials 10 into finished goods 30 that consumers wanted to and could afford to buy. Furthermore, this model only involves financing a single entity, the manufacturer 20.

In today's global economy, an intricate web of interdependent players make up the international supply system, requiring more sophisticated methods of coordination and finance. This complexity challenges the current methods and assumptions, making it more difficult for the financier to gauge the risk involved.

Furthermore, in the conventional supply chain financing, individual decisions are made at the enterprise level regarding the working capital finance structure to support operations. Each company in the supply chain has varying degrees of incentives to pay late and collect funds early, and to push as much inventory onto the balance sheets of its counterparties.

A combination of three emerging technologies has enabled the development of the present invention and its application to supply chain financing. These technologies are Supply Chain Management (SCM) techniques, electronic commerce (EC), and financial market technology. SCM has been defined as the management of flows, including materials, information, and money. Before SCM techniques were introduced, the size of buffer stocks maintained by a manufacturer or supplier were large, and even then, these buffer stocks often could not accommodate the peak seasonal requirements of customers. The introduction of SCM has smoothed out material flows, and this in itself has reduced the working capital expense associated with the high inventories of yesterday.

The second enabling technology that supports the development of the present invention is the transformation of electronic commerce (EC). While EC has been used for many years, start-up costs have been quite high, and many potential applications have therefore been excluded. With the development of company intranets and browser-based applications, new uses of business to business electronic commerce are burgeoning. Savvy financial institutions (e.g., banks) are migrating their information-based products from proprietary in-house developed software to browser-based intranet applications. Accordingly, these savvy institutions are now positioned to access their clients' supply chain data from their clients' electronic commerce and enterprise resource planning (ERP) systems in order to provide financing based on those data.

The third factor that permits the optimization of the present invention is the growth of investor appetite for securities linked to specific cash flows. This form of investment is distinct from investments in securities linked to the risks and rewards of companies themselves, such as equity and debt securities.

In light of the problems associated with the conventional methods of supply chain financing, and in view of the emergence of the above described enabling technologies, it is an object of the present invention to reduce the finance costs associated with the supply chain and to free the movement of goods across the balance sheets of supply chain partners.

SUMMARY OF THE INVENTION

The present invention, Supply Chain Finance (SCF), can be most easily thought of as "just in time money". It is the financial equivalent of materials planning "just in time" (JIT) and its benefits are very similar. Like JIT, the present invention seeks to eliminate inefficiencies that arise when trading partners do not coordinate their demand requirements.

In many cases, a supplier's cost of funds is greater than its buyer's cost of funds. The present invention enables the provision of financing to a supplier at the buyer's lower finance cost. The cost savings can be used to extend the buyer's days payable outstanding, resulting in an improvement in its Shareholder Value Added (SVA). In contrast to the prior art financial technique of factoring, the financing of the present invention is usually mandated by and arranged in conjunction with buyer—not the seller.

Furthermore, the financing of the present invention can be arranged without recourse to the seller, enabling off-balance sheet treatment for the seller. Thus, the SVA for both entities can be improved and the financing takes place at the lowest possible cost for both parties.

As described above, SCM techniques have been developed to coordinate complex supply chain interrelationships. However, one hidden cost of many SCM techniques has been to place greater reliance on suppliers to hold inventory. Many suppliers of United States companies, particularly those located in emerging market countries, have higher cost of funds than do their U.S. customers. The present invention eliminates this inefficiency by ensuring that the capital cost associated with the asset conversion cycle of any given supply chain is the lowest possible.

The present invention takes advantage of the new availability of low cost electronic commerce links between buyers and their financial institutions. These links are used by the institution to access the data contained in the buyer's enterprise resource planning (ERP) systems. With this data in hand, the institutions are able to evaluate, develop and offer highly structured financial products tailored to the clients' dynamic supply chain capital requirements.

BRIEF DESCRIPTION OF THE DRAWINGS

For the purpose of illustrating the present invention, there is shown in the drawings a form which is presently preferred, it being understood, however, that the invention is not limited to the precise arrangement and instrumentality shown.

DETAILED DESCRIPTION OF THE INVENTION

Figure 2:
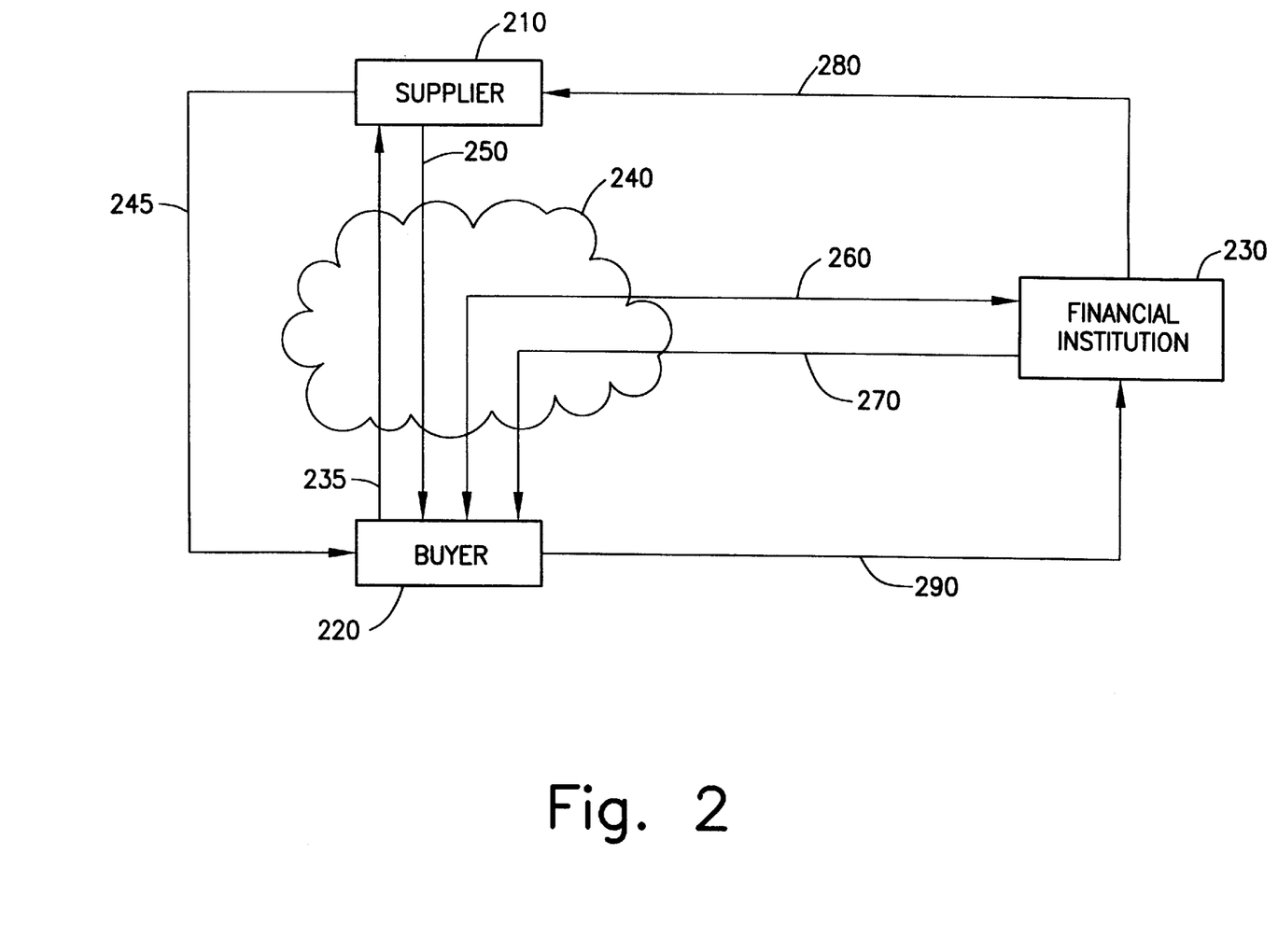
FIG. 2 depicts an Accounts Payable Financing application in accordance with the present invention.

One application of the present invention is Accounts Payable (AP) Financing which is illustrated in FIG. 2. As illustrated in this Figure, there are three entities involved in the essential features of the supply chain financing of the present invention, the supplier or vendor 210, the buyer 220 and the financial institution or advisor 230. In a preferred embodiment of the present invention, the financial institution 230 is a bank and the buyer 22 is a client of the bank.

Prior to actually implementing the present invention, the parties involved must evaluate the potential saving which can be expected from using the Supply Chain Financing of the present invention. This evaluation process typically begins with the buyer 220 hiring the financial advisor 230. The financial institution 230 uses the Trade Cycle Map (FIG. 4) the Supply Chain Financing Formula (described below) and data provided by the buyer 220 to determine whether the potential savings justify expense of proceeding.

The financial advisor 230 reviews the electronic commerce infrastructure among the buyer 220 and its trading partners 210. Although only a single trading partner 210 has been depicted in FIG. 2, the present invention is clearly applicable to multiple trading partners 210 of a buyer 220. In fact, once the setup for the present invention described below has been completed, the buyer will actually experience increased savings with the expansion of the supply chain financing to additional trading partners 210.

If the above evaluation determines that there is sufficient financial benefit, the bank 230 makes recommendations on the structure and implementation approach, taking into account the client's 220 relationships with its trading partners 210 and the client's other non-financial objectives. The financial advisor 230 conducts interviews with the trading partners 210 in order to validate the supply chain assumptions used above in the application of the Supply Chain Savings Formula and to understand other non-financial objectives and business values which may impact the implementation of the present invention. If the results of the interviews are all favorable, and the parties agree to proceed, there are several technical, administrative and legal processes which must be established.

The following set-up procedures are applicable to "true" Accounts Payable Financing in which the buyer accepts responsibility for the payment of the underlying merchandise. The buyer 220 in conjunction with the financial advisor 230 determine the advance financing rates which are applicable for each of the participating vendors 210. The applicable advance rates for each of the vendors 210 will vary depending of the particular circumstances of the vendor 210 and the relationship between the vendor 210 and the buyer 220. A vendor profile is then established for each vendor 210. The vendor profile includes, for example, the payment terms and advance rates established for the particular vendor. The vendor profile is used in the day-to-day processing involved in connection with the supply chain financing of the present invention.

From a legal standpoint, an agreement must be reached between the financial institution 230 and the client 220. One key provision of the agreement includes establishing the rules by which the financial institution can identify when the client has accepted good from the supplier. Typically, the client 220 vouchers the supplier's invoice upon its acceptance of the goods. The rules established in the typical case would therefore indicate that a vouched invoice (or account payable) indicates that the buyer 220 has accepted the goods and payment is due to the supplier 210. The rules would additionally set forth the manner in which the financial institution 230 can properly identify vouchered invoices. In conjunction with the acceptance rules, the client 220 agrees to pay the financial institution 230, acting on behalf of the seller 210, upon maturity of the underlying financing once the financial institution has acted upon a properly identified acceptance by the client 220 (e.g., a vouchered invoice).

Additional provisions in the agreement between the client 220 and the financial institution 230 are: an agreement as to the method and form for resolving post acceptance disputes (usually in the form of a put to the client 220 of the underlying asset); and establishment of reliance on the selected method of communication (this will typically place no liability on the part of financial advisor 230 to advance funds in the event of communications/software failure).

Having resolved the legal issues, the process turns to addressing the technical issues of implementing the present invention. The main technical requirement of the present invention is the establishment by the financial institution 230 and the client 220 of extra/intra/internet dial-up and logon access by the bank 230 to the client's 220 electronic commerce and enterprise resource planning (ERP) systems such as the client's account payable system. In general, most buyers 220 will already have electronic accounting and management systems in place and the above process is merely a matter of providing electronic access to these systems by the financial institution 230. Of course, all of the appropriate security measures for the provision of this access (e.g., passwords . . . ) should be put in place.

Once all of the above described evaluation and setup has been completed, the parties are ready for the actual implementation of the financing. In the Accounts Payable example depicted in FIG. 2, the buyer 220 desires to purchase goods from the supplier 210. To initiate the purchase, the buyer issues a request for goods, e.g., a Purchase Order (PO) in step 235 of the process. In a preferred embodiment, the PO 235 is issued from the buyer 220 to the supplier 210 through an electronic link 240 such as the internet or other electronic data interface. Alternatively, the PO 235 can be issued through traditional mail, voice or facsimile channels, although these methods will inherently slow the process, be less reliable and less conducive to tracking and verification. Regardless of the method of transmittal of the PO 235, the buyer 220 updates its ERP system to reflect the issuance and terms of the PO 235.

In response to its receipt of the PO 235, the supplier 210 ships 245 the goods to the buyer 220 in anticipation of being paid (to be discussed below). In conjunction with shipping 245 the goods, the supplier 210 also transmits 250 invoice data to the buyer 220. Again, in a preferred embodiment, the invoice is sent 250 to the buyer 220 over the electronic link 240, but can be transmitted manually (by mail, voice or facsimile). Alternatively, the shipment 245 of the goods (transfer of title/risk) can be established through the buyer's 220 receipt of the goods at one of its facilities (e.g, through dock or warehouse receipts).

Regardless of the method by which the shipment 245 of the goods is verified, the buyer 220 updates its ERP system to reflect the receipt of the goods. The buyer 220 then matches the delivery/invoice data to the PO data corresponding to the delivery. If the acknowledgement data does not meet the buyer's 220 payment rules, then adjudication is required between the client 220 and the vendor 210 in order to determine the value, if any, of shipped goods which are eligible for financing. If the acknowledgement data meets the client's 220 payment rules, then the buyer 220 may deduct any credits due the buyer 220. Once the validity of the invoice data has been established, the buyer 220 indicates its acceptance of the goods in accordance the manner established by the rules between the buyer 220 and the financial institution 230. In the preferred embodiment of the present invention, the buyer 220 vouchers the account payable (AP) in its ERP system. The voucher must include the payment aging of the individual payment for the particular shipment in question.

In an additional embodiment of the present invention, the financial institution 230 itself performs the back office operation of vouchering the accounts payable for the client 220. In this embodiment, the financial institution 230 has access to the Purchase Order data and the systems used by the client 220 normally used to verify the acceptance of the goods (e.g., reports detailing the physical inspection, quantity, quality . . . of the received goods). In this embodiment, the agreement between the client 220 and the financial institution must carefully delineate the rules governing the process which the financial institution 230 must follow in accepting the goods. This is critical, because, as described below, the acceptance of the goods is the trigger for the financial institution to calculate the financing applicable to the goods and for the forwarding of payment to the supplier.

Returning to the normal AP financing processing, once the verified and vouchered AP has been updated in the client's 220 ERP system, the bank 230 is able to log onto the client's 220 intra/internet server and extract 260 a file containing the daily AP vouchers. In processing the AP vouchers, the financial institution 230 first discards vouchered AP's that do not match established vendor profiles (i.e., vendor for whom supply chain financing has not been set up). The bank 230 then maps vouchered AP's against the vendor profile associated with the vendor 210 which shipped the goods reflected by the vouchered AP. Using the vendor profile, the financial institution 230 calculates the advance rate applicable to financing of the particular transaction. The bank 230 then performs a discount to yield calculation with respect to the value date to maturity based on the advance rate data. This calculation yields the net proceeds which the bank 230 will pay to the supplier 210. The bank 230 then calculates a payment fee (if any), creates an electronic payment file for the net proceeds less payment fee (if any), and sends the payment file to the bank's 230 payment system.

Once the payment file has been created, the bank 230 sends 270 a payment notice to the buyer 220. The payment notice includes the client's 220 reference data (typically the PO number). Upon receipt of the payment notice, the buyer 220 confirms the payment(s) and maturities. In the event there is a discrepancy between the client's 220 AP/ERP system and the bank's 230 payment notice, manual resolution of difference is required. Upon approval of the payment notice and/or resolution of any discrepancies, the bank 230 pays 280 the supplier 210. Alternatively, the bank 230 can pay the supplier 210 simultaneously with its notification to the buyer 220. In this embodiment, the above described agreement between the buyer 220 and the bank 230 governs any dispute as to discrepancies with respect to the payment made by the bank 230 to the supplier 210. In a preferred embodiment, the payment 280 to the supplier 210 is accomplished via Electronic Funds Transfer (EFT).

To close the financing loop, on maturity (the agreeing date), the client 220 remits 290 the gross proceeds to bank, which settles the transaction.

The AP Financing described above in connection with FIG. 2 can work well to improve a buyer's 220 SVA by carefully matching the interest cost savings generated to create additional days payable outstanding for the buyer 220. On the other hand, it can be used more aggressively, as an incentive or quid pro quo for a supplier 210 to accept lower sales prices to its customer/buyer 220. The power of this relatively simple structure can be seen in FIG. 3.

Figure 3:
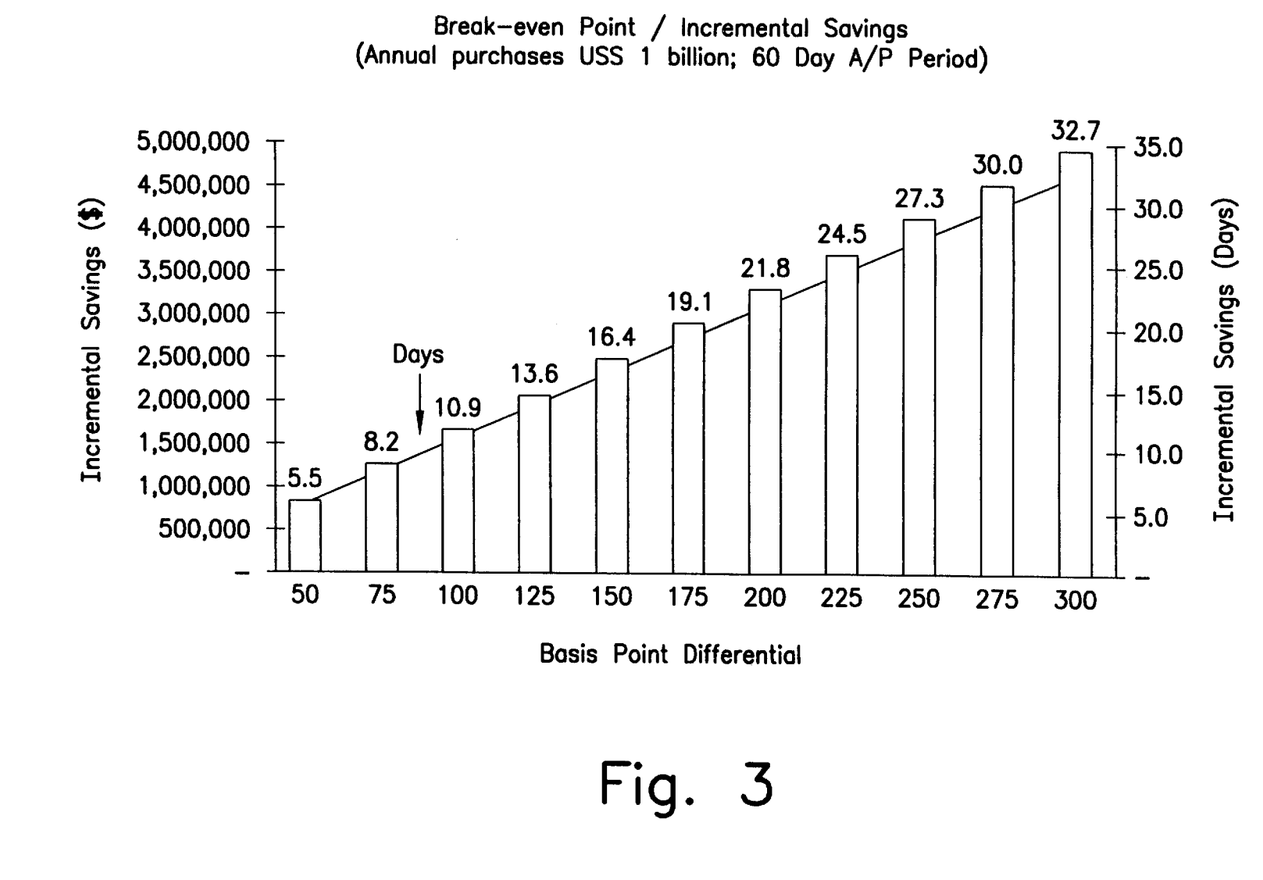
FIG. 3 is a graph illustrating the financial advantages of the use of the present invention.

The chart depicted in FIG. 3 shows the number of additional days outstanding (and their dollar value at the current LIBOR rate) based on the number of basis points (a basis point is 1/100 of 1%) difference between the buyer's 220 and the seller's 210 cost of funds. LIBOR is the London Interbank Offer Rate, the most widely used rate for funding bank loans to large corporations which is currently about 5.625%. As an example of the use of the chart depicted in FIG. 3, if the buyer's 220 cost of funds is 200 basis points less than the seller's 210, and the current payment terms are 60 days, then through the AP structure of the present invention, the buyer 220 could receive an additional 21.8 days of terms from the seller 210 at no additional receivable carrying cost to the seller 210.

The example of AP Financing given above has broad applications. By neutralizing the impact of working capital cost across the supply chain, it can encourage experimentation with various JIT initiatives. The example above shows how SCF of the present invention can help trading partners create more flexible payment arrangements to meet SVA goals. Other SCF structures can help managers optimize the physical location of materials without imposing a financing penalty on one partner. Other structures can facilitate the funding of overseas partners facing dramatically higher funding costs.

Figure 4:
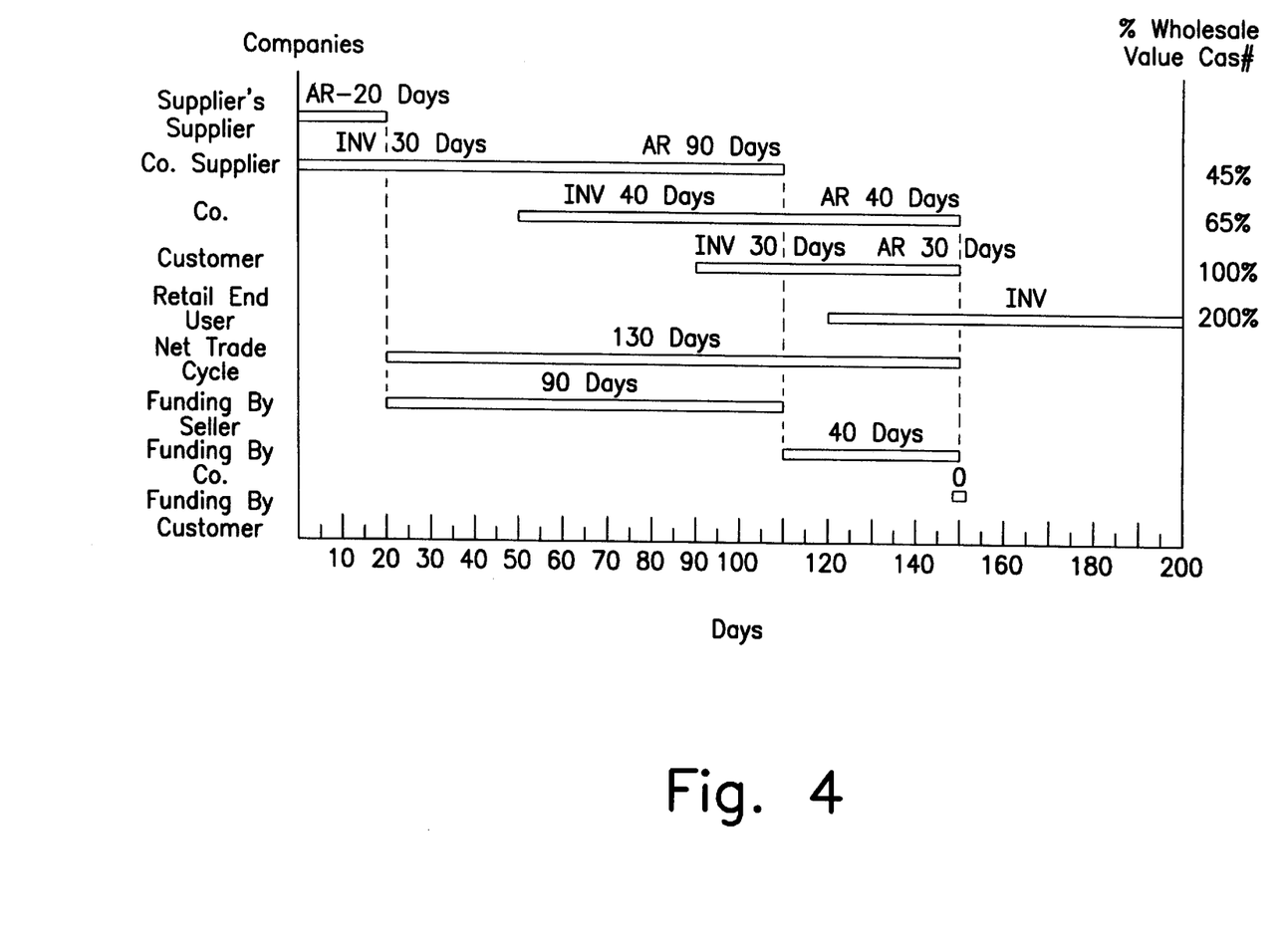
FIG. 4 is a Trade Cycle Map illustrating the assets attributed to the participants in the supply chain.

One step in the process of the present invention briefly described above is evaluating whether the process will be financially beneficial. The first step in evaluating whether or not SCF would provide any benefit to a particular supply chain is to do a quick assessment of the net trade cycle of each individual company within the supply chain in order to determine the dollar value of the potential saving. A simple example of a Trade Cycle Map is shown in FIG. 4. In this case, the supply chain being mapped includes a primary supplier and a single customer, and takes into account the supplier's supplier and the customer's customer, the retail end-user.

The Trade Cycle Map shows the assets attributed to the supply chain for each participant—inventory and accounts receivable. The payable period is the accounts receivable period of the supplier. The chart also shows the percentage of the Wholesale Value Chain, which is used as a factor in order to calculate the potential savings of SCF. The chart can be used to derive the net trade cycle of each participant and, more importantly, the supply chain as a whole.

In this example, the Net Trade Cycle of the defined supply chain is 130 days—the time from when "Supplier" pays "Supplier's Supplier" to the time when "Co." is paid by "Customer". Another way to express this is that the supply chain "turns" 2.8 times per year. It is observed that in this example "Supplier" bears the greatest burden of financing this particular supply chain, 90 of the 130 days or about 70%, whereas "Co." pays about 30% and "Customer" has no direct finance cost, having matched the timing of its receivable with the payment of "Co's" invoice.

The mismatched payment terms in this example are intended to portray the typical historical relationships between buyer and seller over time, and the relative power one has over the other. The challenge foremost to corporate treasurers is to ensure that a company's business mix reflects an overall balance of trading terms so that overall, payables fund much of inventory and some receivables, if possible. However, trade cycles do not get a great deal of attention at the supply chain level, especially if they are being managed well overall at the corporate of division level.

As an illustration of the benefits of the present invention, the following assigns credit costs to each of the players in the example depicted in FIG. 4. Assume "Supplier", who is financing 90 out of the 130 net trade cycle days, is a Korean manufacturer. "Co." is a large middle market manufacturer and distribution company. And further assume that "Customer" is a leading consumer electronics retailer with a top credit rating. The marginal funding costs of each of these entities is as depicted in Table 1.

TABLE 1

| Company | Marginal Funding Cost |
| --- | --- |
| Korean Manufacturer ("Supplier") | LIBOR + 6.5% |
| USA Middle Market Manufacturer ("Co.") | LIBOR + 2.5% |
| Strong Retailer ("Customer") | LIBOR + 0% |

The potential supply chain savings can be derived from the following Supply Chain Financing Formula:

$$V = \sum_{i=1}^{n} P_i * (d_i / t) (\Delta_i - D)$$

Where V is the dollar amount of annual wholesale value chain; n is number of participants, P is the percentage of annual value chain contributed by each participant; d is number of days each participant finances the value chain; t is net trade cycle of supply chain, $\Delta$ is the LIBOR spread of each participant; and D is the LIBOR spread of lowest funding cost supply chain participant.

If $100 million wholesale value is assigned to the example above, the total potential supply chain finance cost savings in this example is therefore $2,525,000 (2.5%). It is this amount that would be shared among the supply chain participants and the investors, according to the performance risks inherent in the transaction and how the financing would be structured.

Figure 5:
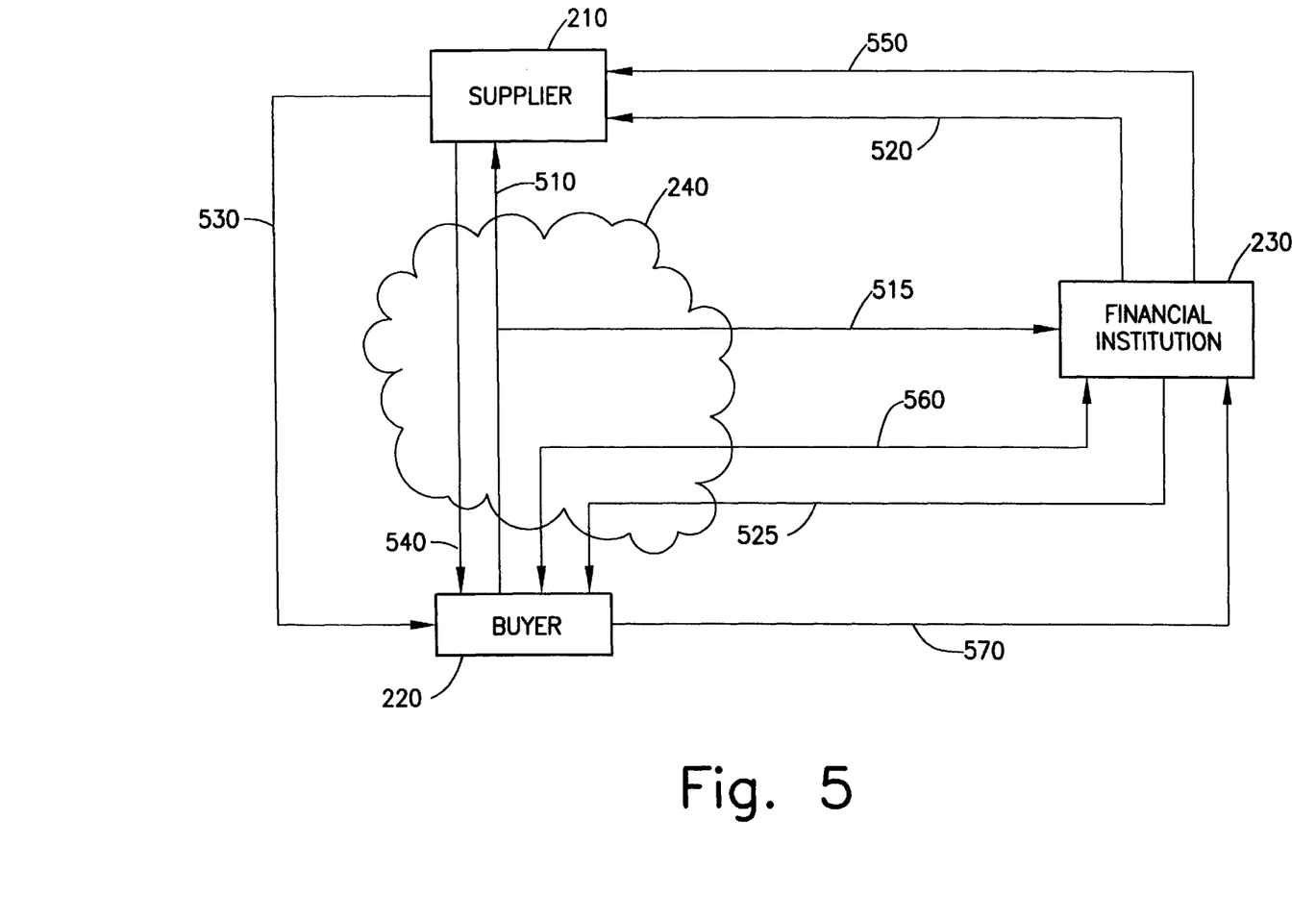
FIG. 5 depicts a Vendor Financing in accordance with the present invention.

FIG. 5 illustrates an alternative embodiment of the present invention. Although this embodiment also uses the Account Payable as the trigger for the financing, in contrast to the previous embodiment, where the buyer assumed full risk, in the present embodiment the seller is advanced a payment prior to shipment of the goods and the buyer has recourse against the supplier for at least part of the advance. This embodiment is known as Vendor Financing.

The evaluation process for Vendor Financing is the same as described above with respect to the AP Financing depicted in FIG. 2. The three entities depicted in FIG. 5, the buyer 220, the supplier 210 and the financial institution 230 are the same as those depicted in FIG. 2. The set-up process for Vendor Financing is slightly different from that described above. In determining the Advance rates which are applicable to the participating suppliers 210, the bank 230 will determine two Advance Rates, one for pre-shipment advances against Purchase Orders and one for post-shipment advances against Accounts Payable. Furthermore, the bank 230 will determine the total amount of final credit that may be taken by the buyer 220 following shipment, against any single payment and a maximum dollar limitation for same.

As with the AP financing described above, an agreement between the buyer 220 and the bank 230 must be reached. Again, a key provision for a Vendor Financing agreement includes establishing the rules by which the financial institution can identify when the client 220 has accepted good from the supplier 210, as previously described above. Other provisions for a Vendor Financing agreement include: the amount and form of recourse to buyer 220 for pre-shipment advances; an agreement by the client 220 to pay the financial institution upon maturity of the underlying item; procedures for the resolution of post acceptance disputes (usually in the form of a put to the client of the underlying asset); procedures for the resolution of pre-acceptance disputes; and establishment of reliance on the selected method of communication (this will typically place no liability on the part of financial advisor 230 to advance funds in the event of communications/software failure).

In addition to an agreement between the bank 230 and the buyer 220 for Vendor Financing, an agreement between the bank 230 and supplier(s) 210 is also required. The key provisions of this agreement between the bank 230 and supplier(s) 210 include: secondary recourse provisions, if any; procedures for the resolution of pre-acceptance disputes; and hold harmless clauses in which no liability on the part of financial advisor 230 to advance funds in the event of communication/software failure.

As in the AP financing, the final technical step is for the financial institution to obtain extra/intra/internet dial-up and logon access to the ERP system of the buyer 220.

The actual financing process for Vendor financing will be described in connection with FIG. 5. As with AP financing, the process starts by the client 220 manually or via electronic link sending 510 a request for goods (e.g., a Purchase Order) to the vendor 210. The fact of the transmission and the contents of the PO are updated in client's ERP system. In parallel with the transmission of the PO to the vendor 210, the PO is also sent 515 to the financial institution 230. This transmission can either be initiated by the buyer 220 or by prearranged and/or regularly scheduled download by the bank 230. In the preferred embodiment, this download occurs via the electronic interface between the bank 230 and the buyer 220.

At the bank 230, the PO data are matched against Vendor Profile. The bank 230 calculates a pre-shipment advance rate applicable to the transaction represented by the PO and runs a discount to yield calculation on value date to estimated settlement date based on the above calculated advance rate. This calculation determines the advance proceeds which will be forwarded to the supplier 210. The financial institution then calculates payment fee, if any, and creates an electronic payment file for the advanced proceeds less the payment fee, if any.

At this point, the advanced proceeds are transferred 520 from the bank 230 to the supplier 210, preferably through Electronic Funds Transfer. The bank 230, in conjunction with the funds transfer, also sends 525 a payment notification to the client 220 which references the client's reference data (typically the PO number). The payment notice confirms the payment(s) to the supplier 210 and also confirms the estimated maturities. This process is slightly different from the process described above with respect to the AP financing in that the funds were sent 520 prior to notifying 525 the buyer 220. Either procedure is acceptable and can be used in either process.

In step 530 the vendor 210 ships the merchandise to the buyer 220. Acknowledgement of merchandise shipment (transfer of title) can be made by one of three ways: via the client's 220 receipt of the goods (as evidenced by a dock or warehouse receipt); via an invoice transmitted 540 by electronic means from the vendor 210 to the buyer 220; or via an invoice in hardcopy form from the vendor 210 to the buyer 230.

Regardless of the method by which the shipment 530 of the goods is acknowledged, the buyer 220 updates its ERP system to reflect the receipt of the goods. The buyer 220 then matches the delivery/invoice data to the PO data corresponding to the delivery. If the acknowledgement data does not meet the buyer's 220 payment rules, then adjudication is required between the client 220 and the vendor 210 in order to determine the value of shipped goods which are ineligible for additional financing. The bank 230 may invoke the recourse provisions of the agreement and have the underlying assets removed from funding.

If the acknowledgement data meets the client's 220 payment rules, then the buyer 220 may deduct any credits due the buyer 220 up to the agreed upon percentage and within the total dollar limitation as set forth in the agreements. Once the validity of the invoice data has been established, the buyer 220 indicates its acceptance of the goods in accordance the manner established by the rules between the buyer 220 and the financial institution 230. Again, as described above with respect to the AP financing embodiment, in the preferred embodiment of the present invention, the buyer 220 vouchers the account payable (AP) in its ERP system. The voucher must include the payment aging of the individual payment for the particular shipment in question.

Once the verified and vouchered AP has been updated in the client's 220 ERP system, the bank 230 is able to log onto the client's 220 intra/internet server and extract 560 a file containing the daily AP vouchers. In processing the AP vouchers, the financial institution 230 first discards vouchered AP's that do not match established vendor profiles (i.e., vendor for whom supply chain financing has not been set up). The bank 230 then maps vouchered AP's against the vendor profile associated with the vendor 210 which shipped the goods reflected by the vouchered AP. Using the vendor profile, the financial institution 230 calculates the advance rate applicable to financing of the particular transaction.

In contrast to the AP financing previously described, the bank 230 then adjusts the discount to yield substituting a final correct settlement date (when the first advance was made, the final settlement date was not fixed) The final settlement date is the date represented by the client's ageing or other rule based date. The financial institution 230 then calculates the discount to yield on the remaining unfunded balance of the shipment value in order to determine the net proceeds which the bank 230 will pay to the supplier 210. The bank 230 then calculates a payment fee (if any), creates an electronic payment file for the net proceeds less payment fee (if any), and sends 550 the payment via EFT to the supplier 210.

Once the net proceed payment has been made 550 to the supplier 210, the bank 230 sends 560 a further payment notice to the buyer 220. The payment notice again includes the client's 220 reference data. Upon receipt of the payment notice, the buyer 220 confirms the payment(s) and maturities. In the event there is a discrepancy between the client's 220 AP/ERP system and the bank's 230 payment notice, manual resolution of difference is required.

To close the Vendor Financing loop, on maturity (the ageing date), the client 220 remits 570 the gross proceeds to bank, which settles the transaction.

Although the present invention has been described in relation to particular embodiments thereof, many other variations and modifications and other uses will become apparent to those skilled in the art. It is preferred, therefore, that the present invention be limited not by the specific disclosure herein, but only the gist and scope of the disclosure.

What is claimed:

1. A method for financing, through a third party, a supply of goods from a supply chain to a buyer, the supply chain consisting of a number of participants, wherein the buyer and each participant in the supply chain have a cost of financing, the method comprising the steps of:

identifying a first participant that has a cost of financing that is the greatest above the buyer's cost of financing;

establishing rules between the buyer and the third party including establishing, in a first rule, a manner in which the third party can identify acceptance data representing acceptance of goods by the buyer;

the third party identifying acceptance data related to goods accepted by the buyer;

calculating the financing for the goods in response to the identified acceptance data and in response to the established rules;

forwarding payment for the goods from the third party to the first participant prior to a time the payment for the goods would normally be payable; and at maturity of the financing, settling the financing between the buyer and the third party.

2. The method as set forth in claim 1, wherein the calculating step comprises the steps of:

determining an advance rate;

performing a discount to yield calculation with respect to a value date to maturity in response to the advance rate; and determining net proceeds in response to the discount to yield calculation, wherein the net proceeds are the payment forwarded to the one participant.

3. The method as set forth in claim 1, further comprising the step of establishing a supplier profile containing advance rates and payment terms applicable to the first participant.

4. The method as set forth in claim 1, wherein the first rule includes an agreement by the buyer to repay payments made by the third party to the first participant in reliance on properly identified acceptance data.

5. The method as set forth in claim 1, wherein the acceptance data is generated by the financial institution by performing an account payable vouchering process for the buyer.

6. The method as set forth in claim 1, further comprising the steps of:

generating a request for the goods by the buyer;

transmitting the request to the supply chain; and shipping the goods from the supply chain to the buyer;

wherein the invoice data is generated by the supply chain and transmitted to the buyer, the invoice data is captured in a buyer's database, and wherein the invoice data is received by the third party from the buyer's database.

7. A method for financing, through a third party, a supply of goods from a supply chain to a buyer, the method comprising the steps of:

establishing rules between the buyer and the third party including establishing, in a first rule, a manner in which the third party can identify acceptance data representing acceptance of goods by the buyer;

the third party identifying acceptance data related to goods accepted by the buyer;

evaluating the savings to be obtained by the financing, wherein the evaluating step is accomplished using the formula:

$$V = \sum_{i=1}^{n} P_i * (d_i/t)(\Delta_i - D)$$

where V is the dollar amount of annual wholesale value of the supply chain; n is the number of participants in the supply chain, P is the percentage of annual wholesale value of the supply chain contributed by each participant; d is number of days each participant finances the wholesale value of the supply chain; t is net trade cycle of the supply chain, $\Delta$ is the LIBOR spread of each participant; and D is the LIBOR spread of the lowest funding cost supply chain participant;

calculating the financing for the goods in response to the identified acceptance data and in response to the established rules;

forwarding payment for the goods from the third party to one of the participants in the supply chain prior to a time the payment for the goods would normally be payable; and at maturity of the financing, settling the financing between the buyer and the third party.

8. A method for financing, through a third party, a supply of goods from a supply chain to a buyer, the supply chain consisting of a number of participants, the method comprising the steps of:

generating request data representing a request for the goods;

receiving the request data by at least one of the participants in the supply chain and the third party;

calculating financing for the requested goods in response to the received request data;

forwarding a first payment for the goods from the third party to the at least one participant;

shipping the goods;

generating invoice data representing the shipment of the goods;

receiving invoice data by the third party representing the shipment of goods;

calculating a remaining payment, if any, with respect to the shipped goods in response to the received invoice data and in response to the first payment;

forwarding the remaining payment, if any, from the third party to the at least one participant; and at maturity of the financing, settling the financing between the buyer and the third party.

9. The method as set forth in claim 8, wherein the financing is calculated using an advance rate and wherein the remaining payment is calculated at a final rate.

10. The method as set forth in claim 9, wherein advance rate and the final rate are different.

11. The method as set forth in claim 8, further comprising the steps of:

prior to calculating the financing for the goods, evaluating the savings to be obtained by the financing.

12. The method as set forth in claim 11, further comprising the step of performing the steps of claim 12 with respect to the participant in the supply chain in which the evaluated savings obtained by the financing is the greatest.

13. The method as set forth in claim 8, wherein the step of calculating the financing comprises the steps of:

determining an advance rate;

performing a discount to yield calculation with respect to a value date to maturity in response to the advance rate; and determining net proceeds in response to the discount to yield calculation, wherein the net proceeds are the first payment forwarded to the at least one participant.

14. The method as set forth in claim 13, wherein the value date to maturity is an estimated value date to maturity.

15. The method as set forth in claim 8, further comprising the step of:

notifying the buyer of the first payment to the at least one participant.

16. The method as set forth in claim 8, further comprising the steps of:

establishing a supplier profile containing a pre-shipment advance rate applicable to financing prior to shipment of the goods and a post-shipment advance rate applicable to financing after shipment of the goods.

17. The method as set forth in claim 16, wherein the step of determining the advance rate comprises retrieving the advance rate from the supplier profile.

18. The method as set forth in claim 8, further comprising the steps of:

determining an amount of final financing available to buyer following shipment of the goods; and determining a maximum dollar limit of the final financing.

19. The method as set forth in claim 8, wherein the third party is a bank.

20. The method as set forth in claim 8, wherein the buyer has recourse against the at least one participant at least with respect to the first payment.

21. The method as set forth in claim 8, wherein at least the first payment is made to the at least one participant by an electronic medium.

22. The method as set forth in claim 8, wherein the request data is a purchase order.

23. The method as set forth in claim 8, wherein the invoice data is generated in response to a receipt of the goods by the buyer.

24. A method for financing, through a third party, a supply of goods from a supply chain to a buyer, the supply chain consisting of a number of participants, wherein the buyer and each participant in the supply chain has a cost of financing, the method comprising the steps of:

generating request data representing a request for the goods;

receiving the request data by at least one of the participants in the supply chain and the third party;

evaluating the savings to be obtained by the financing, wherein the evaluating step is accomplished using the formula:

$$V = \sum_{i=1}^{n} P_i * (d_i/t)(\Delta_i - D)$$

where V is the dollar amount of annual wholesale value of the supply chain; n is the number of participants in the supply chain, P is the percentage of annual wholesale value of the supply chain contributed by each participant; d is number of days each participant finances the wholesale value of the supply chain; t is net trade cycle of the supply chain, $\Delta$ is the LIBOR spread of each participant; and D is the LIBOR spread of the lowest funding cost supply chain participants;

calculating financing for the requested goods in response to the received request data;

forwarding a first payment for the goods from the third party to the first participant;

shipping the goods;

generating invoice data representing the shipment of the goods;

receiving invoice data by the third party representing the shipment of goods;

calculating a remaining payment if any, with respect to the shipped goods in response to the received invoice data and in response to the first payment;

forwarding the remaining payment, if any, from the third party to the first participant; and at maturity of the financing, settling the financing between the buyer and the third party.

* * * * *